(12) United States Patent
Fujino et al.

(10) Patent No.: US 11,251,464 B2
(45) Date of Patent: Feb. 15, 2022

(54) ALL SOLID STATE BATTERY AND METHOD FOR PRODUCING ALL SOLID STATE BATTERY

(71) Applicant: TOYOTA JIDOSHA KABUSHIKI KAISHA, Toyota (JP)

(72) Inventors: Shizuka Fujino, Atsugi (JP); Masahiro Iwasaki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 70 days.

(21) Appl. No.: 16/508,496

(22) Filed: Jul. 11, 2019

(65) Prior Publication Data

US 2020/0044284 A1    Feb. 6, 2020

(30) Foreign Application Priority Data

Aug. 2, 2018    (JP) .............................. JP2018-145907

(51) Int. Cl.
| | |
|---|---|
| *H01M 10/0562* | (2010.01) |
| *H01M 4/131* | (2010.01) |
| *H01M 4/36* | (2006.01) |
| *H01M 4/485* | (2010.01) |
| *H01M 4/62* | (2006.01) |
| *H01M 4/1391* | (2010.01) |
| *H01M 10/0525* | (2010.01) |

(52) U.S. Cl.
CPC ....... *H01M 10/0562* (2013.01); *H01M 4/131* (2013.01); *H01M 4/1391* (2013.01); *H01M 4/366* (2013.01); *H01M 4/485* (2013.01); *H01M 4/621* (2013.01); *H01M 10/0525* (2013.01); *H01M 2300/0068* (2013.01)

(58) Field of Classification Search
None
See application file for complete search history.

(56) References Cited

U.S. PATENT DOCUMENTS

| | | | |
|---|---|---|---|
| 2011/0136017 A1 | 6/2011 | Singh et al. | |
| 2015/0333362 A1 | 11/2015 | Sato et al. | |
| 2015/0372344 A1 | 12/2015 | Iwasaki et al. | |
| 2016/0268596 A1* | 9/2016 | Uchiyama | ............... C23C 18/00 |

(Continued)

FOREIGN PATENT DOCUMENTS

| | | |
|---|---|---|
| JP | 2012-243644 A | 12/2012 |
| JP | 2014-154407 A | 8/2014 |
| JP | 2016-001598 A | 1/2016 |

(Continued)

OTHER PUBLICATIONS

Masafumi Arakawa, "Introduction to Particle Size Measurement", Journal of the Society of Powder Technology, Japan 1980, vol. 17, Issue 6, pp. 299-307, (with Brief Explanation).

*Primary Examiner* — Daniel S Gatewood
(74) *Attorney, Agent, or Firm* — Oliff PLC

(57) ABSTRACT

A main object of the present disclosure is to provide an all solid state battery of which volume change due to charge and discharge is reduced. The present disclosure achieves the object by providing an all solid state battery comprising a cathode layer, an anode layer, and a solid electrolyte layer formed between the cathode layer and the anode layer; wherein the anode layer contains a Si-based active material of which average particle size is less than 2.6 μm, and a first solid electrolyte.

15 Claims, 5 Drawing Sheets

(56) References Cited

U.S. PATENT DOCUMENTS

2017/0033352 A1\* 2/2017 Mizutani .......... H01M 10/0562
2017/0077732 A1 3/2017 Otaki et al.

FOREIGN PATENT DOCUMENTS

| JP | 2016-207418 A | 12/2016 |
| JP | 2017-027886 A | 2/2017 |
| JP | 2017-059534 A | 3/2017 |
| JP | 2017-152347 A | 8/2017 |

\* cited by examiner

Example 1

Example 2

Comparative Example 1

ALL SOLID STATE BATTERY AND METHOD FOR PRODUCING ALL SOLID STATE BATTERY

TECHNICAL FIELD

The present disclosure relates to an all solid state battery and the method for producing thereof.

BACKGROUND ART

An all solid state battery is a battery including a solid electrolyte layer between a cathode layer and an anode layer, and one of the advantages thereof is that the simplification of a safety device may be more easily achieved compared to a liquid-based battery including a liquid electrolyte containing a flammable organic solvent.

Patent Literature 1 discloses a lithium ion secondary battery wherein the ratio of the particle size of a solid electrolyte configured in a solid electrolyte layer and the particle size of an active material configured in an active material layer (particle size of solid electrolyte/particle size of active material) is in a range of 3.0 to 10.0. The object of this technique is to provide a lithium ion secondary battery of which interface resistance between the active material layer and the solid electrolyte layer is low.

Patent Literature 2 discloses an electrode comprising an active material layer containing an active material particle (lithium titanate) and a solid electrolyte particle, wherein an average particle size Sg of the solid electrolyte particle is smaller than an average particle size Tg of the active material particle. Also, Patent Literature 3 discloses an electrode mixture comprising: a composite active material particle comprising an active material particle (such as graphite) covered with a sulfide-based solid electrolyte; a fiber conductive material; and a sulfide-based solid electrolyte particle of which average particle size is smaller than that of the composite active material particle. Patent Literature 4 discloses a composite active material comprising a composite particle containing an oxide-based solid electrolyte that covers a whole or a part of the surface of an active material particle, and a sulfide-based solid electrolyte that further covers 76.0% or more of the surface of the composite particle.

CITATION LIST

Patent Literatures

Patent Literature 1: Japanese Patent Application Laid-Open (JP-A) No. 2016-001598
Patent Literature 2: JP-A No. 2012-243644
Patent Literature 3: JP-A No. 2016-207418
Patent Literature 4: JP-A No. 2014-154407

SUMMARY OF DISCLOSURE

Technical Problem

A Si particle has large theoretical capacity and is effective for high energy densification of a battery. On the other hand, the volume change of the Si particle due to charge and discharge is large and capacity is easily degraded.

The present disclosure has been made in view of the above circumstances, and a main object thereof is to provide an all solid state battery of which volume change due to charge and discharge is reduced.

Solution to Problem

In order to solve the problem, the present disclosure provides an all solid state battery comprising a cathode layer, an anode layer, and a solid electrolyte layer formed between the cathode layer and the anode layer; wherein the anode layer contains a Si-based active material of which average particle size is less than 2.6 μm, and a first solid electrolyte.

According to the present disclosure, the specific Si-based active material is used as the anode active material, and thus the volume change of the all solid state battery due to charge and discharge may be reduced.

In the disclosure, a coating layer containing a second solid electrolyte may be formed on a surface of the Si-based active material.

In the disclosure, the coverage of the coating layer may be 70% or more.

In the disclosure, a thickness of the coating layer may be 30 nm or less.

In the disclosure, the coating layer may contain a conductive material.

In the disclosure, a specific surface area of the conductive material may be 370 $m^2$/g or more.

In the disclosure, in a cross-section of the anode layer, when a pore having an area of 0.1 $μm^2$ or less is regarded as a micro pore, the number of the micro pore per unit area may be 5 pieces/$μm^2$ or more.

The present disclosure also provides a method for producing an all solid state battery comprising a cathode layer, an anode layer, and a solid electrolyte layer formed between the cathode layer and the anode layer, the method comprises steps of: a preparing step of preparing a Si-based active material of which average particle size is less than 2.6 μm; and an anode layer forming step of forming the anode layer using an anode mixture containing the Si-based active material and a first solid electrolyte.

According to the present disclosure, the anode layer is formed using the specific Si-based active material so as to obtain an all solid state battery of which volume change due to charge and discharge is reduced.

In the disclosure, in the preparing step, a compression shearing treatment may be conducted to a mixture containing the Si-based active material and a second solid electrolyte to form a coating layer containing the second solid electrolyte on a surface of the Si-based active material.

In the disclosure, in the mixture, an average particle size of the Si-based active material may be smaller than an average particle size of the second solid electrolyte.

In the disclosure, peripheral speed in the compression shearing treatment may be 26.4 m/s or more.

Advantageous Effects of Disclosure

The all solid state battery in the present disclosure exhibits an effect such that the volume change due to charge and discharge can be reduced.

DESCRIPTION OF EMBODIMENTS

The all solid state battery and the method for producing thereof in the present disclosure will be hereinafter described in detail.

Figure 1:
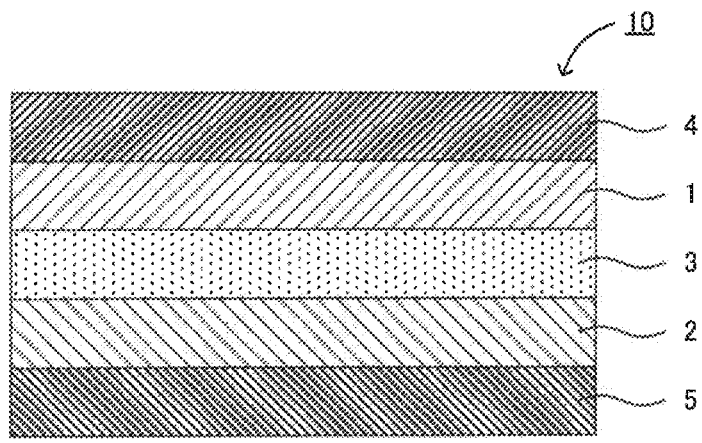
FIG. 1 is a schematic cross-sectional view illustrating an example of the all solid state battery in the present disclosure.

A. All solid state battery FIG. 1 is a schematic cross-sectional view illustrating an example of the all solid state battery in the present disclosure. All solid state battery 10 illustrated in FIG. 1 comprises cathode layer 1, anode layer 2, and solid electrolyte layer 3 formed between cathode layer 1 and anode layer 2. All solid state battery 10 further comprises cathode current collector 4 for collecting currents of cathode layer 1, and anode current collector 5 for collecting currents of anode layer 2. Incidentally, although not illustrated specifically, it is preferable that all solid state battery 10 has a known outer packaging body. One of the features of the present disclosure is that anode layer 2 contains the specific Si-based active material and a first solid electrolyte.

According to the present disclosure, the specific Si-based active material is used as the anode active material, and thus the volume change of the all solid state battery due to charge and discharge may be reduced. The performance of an all solid state battery is greatly influenced by the bonding state of the solid-solid interface among an active material, a conductive material, and a solid electrolyte. Meanwhile, although a Si-based active material is a next generation material having capability such as rapid charge, the volume change due to charge and discharge is large and thus the maintenance of strong solid-solid interface is difficult. Also, the increase of internal pressure due to expansion during charge easily results in the increase in size of a confining jig. To solve the problem, in the present disclosure, a Si-based active material of small average particle size is used and thus an all solid state battery of which volume change due to charge and discharge is reduced may be obtained. Accordingly, strong solid-solid interface can be maintained and battery properties such as cycle properties and capacity properties may be improved. In addition, increase in size of a confining jig may also be restrained.

Here, when a Si-based active material of large average particle size is used, the Si-based active materials contact with each other to easily form a bridge. When the bridge is formed, the effect of expanded Si-based active material easily appears as the expansion of the anode layer overall. To solve the problem, in the present disclosure, the Si-based active material of small average particle size is used so as to inhibit the formation of the bridge between the Si-based active materials. Accordingly, a part of the expanded Si-based active material enters to, for example, a pore (void) in the anode layer and thereby the expansion of the anode layer overall may be easily moderated. As the result, the volume change of the all solid state battery due to charge and discharge may be reduced.

As described later, in the present disclosure, it has been confirmed that the volume change due to charge and discharge can be reduced by coating the surface of the Si-based active material with the coating layer containing a solid electrolyte. Also, in the present disclosure, it has been confirmed that increasing the number of the micro pore is effective for reducing the volume change due to charge and discharge. Further, it has been confirmed that increasing the specific surface area of the conductive material included in the coating layer is effective for reducing internal resistance. These effects are different effects not conventionally known.

1. Anode Layer

The anode layer contains a Si-based active material and a first solid electrolyte. Also, the anode layer may contain at least one of a first conductive material and a binder as required. Also, as described later, a coating layer containing a second solid electrolyte and a second conductive material may be formed on the surface of the Si-based active material. Incidentally, in the present disclosure, the first solid electrolyte or the second solid electrolyte may be referred to as simply a solid electrolyte in some cases. In the same manner, in the present disclosure, the first conductive material or the second conductive material may be referred to as simply a conductive material in some cases.

(1) Anode Active Material

The anode layer contains the Si-based active material as an anode active material. The Si-based active material is preferably an active material capable of being alloyed with Li. Examples of the Si-based active material may include a simple substance of Si, a Si alloy, and a Si oxide. It is preferable that the Si alloy contains Si elements as a main component. The proportion of the Si element in the Si alloy may be, for example, 50 mol % or more, may be 70 mol % or more, and may be 90 mol % or more. Examples of the Si oxide may include SiO.

The anode layer may contain, as the anode active material, just the Si-based active material, and may contain an additional active material. In the latter case, the proportion of the Si-based active material in all the anode active materials may be 50 weight % or more, may be 70 weight % or more, and may be 90 weight % or more.

The average particle size of the Si-based active material is usually less than 2.6 μm, may be 1.5 μm or less, may be 1.0 μm or less, and may be 0.5 μm or less. Meanwhile, the average particle size of the Si-based active material is, for example, 1 nm or more. Incidentally, the average particle size of the Si-based active material may be defined as $D_{50}$, and may be calculated from the measurement with means such as a laser diffraction particle distribution meter and a scanning electron microscope (SEM). In the case of the measurement with SEM, the number of samples is preferably a lot; for example, it is 50 or more, and may be 100 or more.

Also, the coating layer containing the second solid electrolyte may be formed on the surface of the Si-based active material. It means that the anode layer may contain, as the anode active material, a coated active material including the Si-based active material and the coating layer that coats the surface of the Si-based active material and contains the second solid electrolyte. The presence of the coating layer on the surface of the Si-based active material may easily generate the later described micro pore that may reduce the volume change due to charge and discharge.

The coating layer contains the second solid electrolyte. The second solid electrolyte is the same as the later described first solid electrolyte; thus the description herein is omitted. Also, the second solid electrolyte and the first solid electrolyte may be the same material and may be different materials. In the present disclosure, the second solid electrolyte is preferably a sulfide solid electrolyte. The reason therefor is that the sulfide solid electrolyte is a soft material containing a S element, in which the micro pore is easily formed during pressing.

The content of the second solid electrolyte in the coating layer is, when the Si-based active material is 100 parts by weight, for example, 1 part by weight or more, may be 5 parts by weight or more, and may be 10 parts by weight or more. Meanwhile, the content of the second solid electrolyte in the coating layer is, when the Si-based active material is 100 parts by weight, for example, 63 parts by weight or less, and may be 41 parts by weight or less.

The coating layer preferably contains a second conductive material in addition to the second solid electrolyte. The reason therefor is to improve the electron conductivity in the coating layer. Examples of the second conductive material may include a carbon material and a metal material. Examples of the carbon material may include acetylene black (AB), Ketjen black (KB), carbon nanotube (CNT), and carbon nanofiber (CNF). Examples of the metal material may include Ni, Cu, Fe, and SUS. Also, examples of the shape of the second conductive material may include a ball shape and a fiber shape.

The specific surface area of the second conductive material is preferably large. The specific surface area of the second conductive material is, for example, 90 $m^2/g$ or more, may be 140 $m^2/g$ or more, and may be 370 $m^2/g$ or more. Meanwhile, the specific surface area of the second conductive material is, for example, 1000 $m^2/g$ or less. The specific surface area of the second conductive material may be determined by, for example, a BET method.

The content of the second conductive material in the coating layer is, when the Si-based active material is 100 parts by weight, for example, 0.1 parts by weight or more, and may be 0.5 parts by weight or more. Meanwhile, the content of the second conductive material in the coating layer is, when the Si-based active material is 100 parts by weight, for example, 5 parts by weight or less, and may be 3 parts by weight or less.

The coverage of the coating layer is, for example, 70% or more, may be 75% or more, and may be 80% or more. Meanwhile, the coverage of the coating layer may be 100% and may be less than 100%. The coverage of the coating layer may be determined by, for example, an X-ray photoelectron spectroscopy (XPS) measurement.

The thickness of the coating layer is, for example, 0.1 nm or more, and may be 1 nm or more. Meanwhile, the thickness of the coating layer is, for example, 50 nm or less, and may be 30 nm or less. The thickness of the coating layer may be determined by the observation with a transmittance electron microscope (TEM).

The proportion of the anode active material in the anode layer is, for example, 20 weight % or more, may be 30 weight % or more, and may be 40 weight % or more. Meanwhile, the proportion of the anode active material is, for example, 80 weight % or less, may be 70 weight % or less, and may be 60 weight % or less.

(2) First Solid Electrolyte

The anode layer may contain a first solid electrolyte as required. The first solid electrolyte refers to a solid electrolyte other than the solid electrolyte (second solid electrolyte) included in the coating layer of the coated active material.

Examples of the first solid electrolyte may include an inorganic solid electrolyte such as a sulfide solid electrolyte, an oxide solid electrolyte, a nitride solid electrolyte, and a halide solid electrolyte.

Examples of the sulfide solid electrolyte may include a solid electrolyte containing a Li element, an X element (X is at least one kind of P, As, Sb, Si, Ge, Sn, B, Al, Ga, and In), and a S element. Also, the sulfide solid electrolyte may further contain at least one of an O element and a halogen element. Examples of the halogen element may include a F element, a Cl element, a Br element, and an I element.

The sulfide solid electrolyte preferably comprises an ion conductor containing a Li element, an A element (A is at least one kind of P, As, Sb, Si, Ge, Al, and B), and a S element. In addition, the Li content in the ion conductor is preferably high. Also, the ion conductor preferably has the anion structure of ortho composition ($PS_4^{3-}$ structure, $SiS_4^{4-}$ structure, $GeS_4^{4-}$ structure, $AlS_3^{3-}$ structure, and $BS_3^{3-}$ structure) as the main component of anion for the reason that their chemical stability is high. The proportion of the anion structure of ortho composition is, to all the anion structures in the ion conductor, preferably 70 mol % or more, and more preferably 90 mol % or more. The proportion of the anion structure of ortho composition may be determined by, for example, a Raman spectroscopy, NMR, and XPS.

The sulfide solid electrolyte may contain lithium halide in addition to the ion conductor. Examples of the lithium halide may include LiF, LiCl, LiBr, and LiI, and among them, LiCl, LiBr, and LiI are preferable. The proportion of the LiX (X=F, I, Cl, Br) in the sulfide solid electrolyte is, for example, 5 mol % or more, and may be 15 mol % or more. Meanwhile, the proportion of the LiX is, for example, 30 mol % or less, and may be 25 mol % or less.

Specific examples of the sulfide solid electrolyte may include $xLi_2S\cdot(100-x)P_2S_5$ ($70 \leq x \leq 80$), and $yLiL\cdot zLiBr\cdot(100-y-z)$ ($xLi_2S\cdot(100-x)P_2S_5$) ($70 \leq x \leq 80$, $0 \leq y \leq 30$, $0 \leq z \leq 30$).

The sulfide solid electrolyte may be a glass-based sulfide solid electrolyte, and may be a glass ceramic-based sulfide solid electrolyte. The glass-based sulfide solid electrolyte may be obtained by vitrifying of a raw material. The glass ceramic-based sulfide solid electrolyte may be obtained by, for example, heat treating the above described glass-based sulfide solid electrolyte.

Also, the sulfide solid electrolyte preferably has a specific crystal structure. Examples of the crystal structure may include Thio-LISICON type crystal structure, LGPS type crystal structure, and Argyrodite type crystal structure. Examples of the sulfide solid electrolyte having Thio-LISICON type crystal structure may include $Li_{(4-x)}Ge_{(1-x)}P_xS_4$. Also, examples of the sulfide solid electrolyte having LGPS type crystal structure may include $Li_{(4-x)}Ge_{(1-x)}P_xS_4$ (x satisfies $0<x<1$). Incidentally, Sb, Si, Sn, B, Al, Ga, In, Ti, Zr, V, and Nb may be used instead of at least one of Ge and P. Also, a part of Li may be substituted with Na, K, Mg, Ca, and Zn. In addition, a part of S may be substituted with halogen (F, Cl, Br, I). Examples of the sulfide solid electrolyte having Argyrodite type crystal structure may include $Li_{7-x-2y}PS_{6-x-y}X_y$, $Li_{8-x-2y}SiS_{6-x-y}$, and $Li_{8-x-2y}GeS_{6-x-y}X_y$. Incidentally, X is at least one kind of F, Cl, Br, and I, and x and y respectively satisfies $0 \leq x$ and $0 \leq y$).

Also, examples of the oxide solid electrolyte may include a solid electrolyte containing a Li element, a Y element (Y is at least one kind of Nb, B, Al, Si, P, Ti, Zr, Mo, W, and S), and an O element. Specific examples may include a garnet type solid electrolyte such as $Li_7La_3Zr_2O_{12}$, $Li_{7-x}La_3(Zr_{2-x}Nb_x)O_{12}$ ($0 \leq x \leq 2$), and $Li_5La_3Nb_2O_{12}$; a perovskite type solid electrolyte such as (Li, La)$TiO_3$, (Li, La)$NbO_3$, and (Li, Sr)(Ta, Zr)$O_3$; a nasicon type solid electrolyte such as Li(Al, Ti)$(PO_4)_3$, and Li(Al, Ga)$(PO_4)_3$; a Li—P—O-based solid electrolyte such as $Li_3PO_4$ and LIPON (a compound in which a part of O in $Li_3PO_4$ is substituted with N); and a Li—B—O-based solid electrolyte such as $Li_3BO_3$ and a compound in which a part of O in $Li_3BO_3$ is substituted with C. Also, examples of the nitride solid electrolyte may include $Li_3N$. Also, examples of the halide solid electrolyte may include LiCl, LiI, LiBr, and $Li_3YCl_6$.

Examples of the shape of the first solid electrolyte may include a granular shape. There are no particular limitations on the average particle size of the first solid electrolyte; for example, it is 0.05 µm or more, and may be 0.1 µm or more. Meanwhile, the average particle size of the first solid electrolyte is, for example, 50 µm or less, and may be 20 µm or less. Incidentally, the average particle size of the first solid electrolyte may be defined as $D_{50}$, and may be calculated from a measurement with means such as a laser diffraction particle distribution meter and a scanning electron microscope (SEM). In the case of the measurement with SEM, the number of samples is preferably a lot; for example, it is 50 or more, and may be 100 or more. Also, the average particle size of the first solid electrolyte is preferably larger than the average particle size of the Si-based active material.

The proportion of the first solid electrolyte in the anode layer is, for example, 1 weight % or more, and may be 10 weight % or more. Meanwhile, the proportion of the first solid electrolyte in the anode layer is, for example, 60 weight % or less, and may be 50 weight % or less.

(3) First Conductive Material

The anode layer may contain a first conductive material as required. The first conductive material refers to a conductive material other than the conductive material (second conductive material) included in the coating layer of the coated active material. Incidentally, the first conductive material is the same as the above described second conductive material; thus the description herein is omitted. Also, the first conductive material and the second conductive material may be the same material, and may be different materials.

The proportion of the first conductive material in the anode layer is, for example, 10 weight % or less, may be 7 weight % or less, and may be 5 weight % or less. Meanwhile, the proportion of the first conductive material in the anode layer is, for example, 0.1 weight % or more.

(4) Binder

The anode layer may contain a binder as required. Examples of the binder may include a fluoride-based binder such as polyvinylidene fluoride (PVDF), polytetra fluoroethylene (PTFE), polyvinylidene fluoride-polyhexa fluoro propylene copolymer (PVDF-HFP), and fluorine rubber; and a rubber-based binder such as butadiene rubber, hydrogenated butadiene rubber, styrene butadiene rubber (SBR), hydrogenated styrene butadiene rubber, nitrile butadiene rubber, hydrogenated nitrile butadiene rubber, and ethylene propylene rubber. Also, an acrylic binder may be used.

The proportion of the binder in the anode layer is, for example, 10 weight % or less, may be 5 weight % or less, and may be 3 weight % or less. Meanwhile, the proportion of the binder in the anode layer is, for example, 0.1 weight % or more.

(5) Anode Layer

The anode layer in the present disclosure preferably has a lot of micro pores so as to further restrain the volume change due to charge and discharge. Here, in the cross-section of the anode layer, a pore having an area of 0.1 µm² or less is regarded as a micro pore. In the present disclosure, the number of the micro pore per unit area is, for example, 4 pieces/µm² or more, may be 5 pieces/µm² or more, may be 6 pieces/µm² or more, may be 8 pieces/µm² or more, and may be 10 pieces/µm² or more. Meanwhile, there are no particular limitations on the number of the micro pore per unit area; for example, it is 100 pieces/µm² or less.

The number of the micro pore per unit area may be measured by the following method. First, expose the cross-section of the anode layer, and observe thereof using a field emission type scanning electron microscope (FE-SEM) in the conditions of magnification of 20000 times and evaluation area of 4 µm by 6 µm. Next, visually specify pores (voids). On this occasion, specify the pores regardless of the size of pores. Incidentally, visually, a pore of approximately 0.0003 µm² or more can be distinguished as a pore. Next, regarding the specified pores, determine the area of each pore by image processing to determine the number of micro pores (pores having an area of 0.1 µm² or less) per unit area (1 µm²). It is preferable that the number of the micro pore per unit area is determined based on a lot of SEM images; the number of samples of SEM images is, for example, 10 or more, may be 100 or more, and may be 300 or more.

The thickness of the anode layer is, for example, 0.1 µm or more and 1000 µm or less.

2. Cathode Layer

The cathode layer is a layer containing at least a cathode active material. Also, the cathode layer may contain at least one of a solid electrolyte, a conductive material, and a binder, as required.

The cathode active material is an active material of which charge and discharge reactions occur at nobler potential than that of the Si-based active material. Examples of the cathode active material may include rock salt bed type oxide such as $LiCoO_2$, $LiNiO_2$, $LiNi_{1-x-y}Mn_xCo_yO_2$ ($0<x$, $0<y$), $LiVO_2$, and $LiCrO_2$; spinel type oxide such as $LiMn_2O_4$, $Li_{1+x}Mn_{2-x-y}M_yO_4$ ($x+y<2$, M is at least one kind of Al, Mg, Co, Fe, Ni and Zn), and $Li_2NiMn_3O_8$; lithium titanate such as $Li_4Ti_5O_{12}$; lithium metal phosphate such as $LiMPO_4$ (M is at least one kind of Fe, Mn, Co and Ni); transition metal oxide such as $V_2O_3$ and $MoO_3$; titanium sulfide such as $TiS_2$; a carbon material such as mesocarbon microbeads (MCMB), highly oriented pyrolytic graphite (HOPG), graphite, hard carbon, and soft carbon.

In the present disclosure, the cathode active material is preferably an oxide active material. The reason therefor is that oxide active materials generally have high capacity.

Also, a protective layer containing a Li ion conductive oxide may be formed on the surface of the cathode active material. The reason therefor is to inhibit the reaction of the cathode active material with the solid electrolyte. Examples of the Li ion conductive oxide may include $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2MoO_4$, and $Li_2WO_4$. The coverage of the protective layer is, for example, 70% or more, may be 80% or more, and may be 90% or more. The thickness of the protective layer is, for example, 0.1 nm or more, and may be 1 nm or more. Meanwhile, the thickness of the protective layer is, for example, 100 nm or less, and may be 20 nm or less.

Examples of the shape of the cathode active material may include a granular shape. There are no particular limitations on the average particle size of the cathode active material; for example, it is 10 nm or more, and may be 100 nm or more. Meanwhile, the average particle size of the cathode active material is, for example, 50 μm or less, and may be 20 μm or less. Incidentally, the average particle size of the cathode active material may be defined as $D_{50}$, and may be calculated from the measurement with means such as a laser diffraction particle distribution meter and a scanning electron microscope (SEM). In the case of the measurement with SEM, the number of samples is preferably a lot; for example, it is 50 or more, and may be 100 or more.

The proportion of the cathode active material in the cathode layer is, for example, 20 weight % or more, may be 30 weight % or more, and may be 40 weight % or more. Meanwhile, the proportion of the cathode active material is, for example, 80 weight % or less, may be 70 weight % or less, and may be 60 weight % or less.

The solid electrolyte, the conductive material, and the binder to be used in the cathode layer are in the same contents as those described in "1. Anode layer" above; thus, the descriptions herein are omitted.

The thickness of the cathode layer is, for example, 0.1 μm or more and 1000 μm or less.

3. Solid Electrolyte Layer The solid electrolyte layer is a layer formed between the cathode layer and the anode layer, and contains at least a solid electrolyte and may further contain a binder as required. The solid electrolyte and the binder are in the same contents as those described in "1. Anode layer" above; thus, the descriptions herein are omitted. Also, the thickness of the solid electrolyte layer is, for example, 0.1 μm or more and 1000 μm or less.

4. Other Constitutions

The all solid state battery in the present disclosure comprises at least the above described anode layer, cathode layer, and solid electrolyte layer, and usually further comprises a cathode current collector for collecting currents of the cathode layer and an anode current collector for collecting currents of the anode layer. Examples of a material for the cathode current collector may include SUS, aluminum, nickel, iron, titanium, and carbon. On the other hand, examples of a material for the anode current collector may include SUS, copper, nickel, and carbon. Incidentally, the thickness and the shape of the cathode current collector and the anode current collector are preferably appropriately selected in accordance with the application of the all solid state battery.

Also, the all solid state battery in the present disclosure may further comprise a confining jig that applies a confining pressure to the cathode layer, the solid electrolyte layer, and the anode layer, along with their thickness direction. As the confining jig, a known jig may be used. The confining pressure is, for example, 0.1 MPa or more, may be 1 MPa or more, and may be 5 MPa or more. Meanwhile, the confining pressure is, for example, 100 MPa or less, may be 50 MPa or less, and may be 20 MPa or less.

5. All Solid State Battery

The all solid state battery in the present disclosure is usually a battery in which a metal ion is conducted between the cathode layer and the anode layer, and is preferably a lithium ion battery. Also, the all solid state battery in the present disclosure may be a primary battery and may be a secondary battery, but is preferably a secondary battery among them so as to be repeatedly charged and discharged and useful as a car-mounted battery for example. The secondary battery includes the usage of the secondary battery as a primary battery (for the purpose of just one time charge).

Also, the all solid state battery in the present disclosure may be a single battery, and may be a layered battery. The layered battery may be a monopolar type layered battery (layered battery connected in parallel), and may be a bipolar type layered battery (layered battery connected in series). Examples of the shape of the all solid state battery may include a coin shape, a laminate shape, a cylindrical shape, and a square shape.

B. Method for Producing all Solid State Battery

Figure 2:
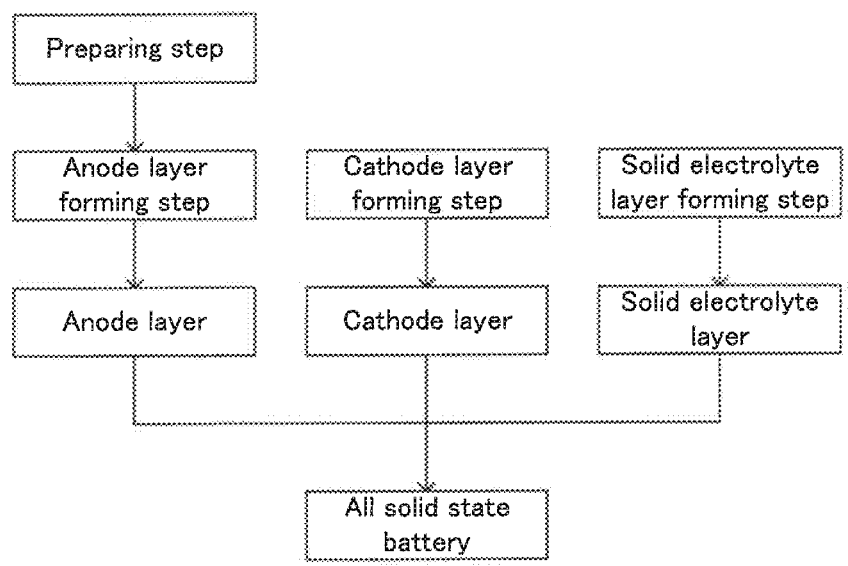
FIG. 2 is a flow chart explaining an example of the method for producing the all solid state battery in the present disclosure.

FIG. 2 is a flow chart explaining an example of the method for producing the all solid state battery in the present disclosure. In FIG. 2, first, the specific Si-based active material is prepared (preparing step). Next, an anode layer is formed using an anode mixture containing the Si-based active material and a first solid electrolyte (anode layer forming step). Also, based on a known method, a cathode layer and a solid electrolyte layer are formed (cathode layer forming step, solid electrolyte layer forming step). The cathode layer, the solid electrolyte layer, and the anode layer are layered in this order to obtain an all solid state battery. Incidentally, there are no particular limitations on the order of producing each layer and on the order of layering each layer.

According to the present disclosure, the anode layer is formed using the specific Si-based active material so as to obtain an all solid state battery of which volume change due to charge and discharge is reduced.

1. Preparing Step

The preparing step is a step of preparing the specific Si-based active material. In the present disclosure, the above described coating layer may be formed on the surface of the Si-based active material. It means that the above described coated active material may be prepared. The coated active material may be fabricated by one own and may be purchased from others.

In the present disclosure, it is preferable that a compression shearing treatment is conducted to the mixture containing the Si-based active material and a second solid electrolyte in order to form a coating layer containing the second solid electrolyte, on the surface of the Si-based active material. Thereby, the above described coated active material may be obtained.

In the mixture, the average particle size of the Si-based active material is preferably smaller than the average particle size of the second solid electrolyte. The rate (B/A) of the average particle size (B) of the Si-based active material to the average particle size (A) of the second solid electrolyte is, for example, 0.9 or less, may be 0.6 or less, and may be 0.4 or less. Meanwhile, the rate (B/A) is, for example, 0.05 or more.

The compression shearing treatment is preferably a mechanical kneading treatment rotating a blade to apply a compression shearing energy to the mixture present in between the blade and the wall of a container. The compression shearing treatment using a rotating blade is typically a medium-free treatment not using a crushing medium (such as a ball and beads). Accordingly, compared to the case using a crushing medium, mechanical damage and heat damage to the Si-based active material may be reduced.

Examples of a compression shearing treatment device may include a mechano-fusion system and a hybridization system. Examples of the compression shearing treatment device may include NOBILTA™ (from HOSOKAWA MICRON CORPORATION) and COMPOSI™ (from NIPPON COKE & ENGINEERING COMPANY, LIMITED). Also, examples of a material for the blade may include ceramic, glass, and metal. Also, the compression shearing treatment may be a dry treatment and may be a wet treatment.

Blade peripheral speed in the compression shearing treatment is, for example, 6 m/s or more, may be 9 m/s or more, and may be 26.4 m/s or more. When the blade peripheral speed is too slow, coating may take time and there is a possibility that the productivity may be degraded. Meanwhile, the blade peripheral speed is, for example, 30 m/s or less. When the blade peripheral speed is too fast, a cooling device becomes large and there is a possibility that the cost may be increased. Incidentally, the blade peripheral speed is a peripheral speed of the outermost periphery of the blade arranged at a rotor. Also, the rotation number of blade is, for example, 500 rpm or more, may be 1000 rpm or more, and may be 2000 rpm or more. Meanwhile, the rotation number of blade is, for example, 5000 rpm or less, and may be 4000 rpm or less.

The distance between the blade and the wall of a container is, for example, 0.1 mm or more, may be 0.2 mm or more, and may be 0.5 mm or more. Meanwhile, the distance between the blade and the wall of a container is, for example, 5 mm or less, and may be 2 mm or less. Also, the treatment time of the compression shearing treatment is, for example, 5 minutes or more, and may be 10 minutes or more. Meanwhile, the treatment time of the compression shearing treatment is, for example, 30 minutes or less, and may be 20 minutes or less.

2. Anode Layer Forming Step

The anode layer forming step is a step of forming the anode layer using an anode mixture containing the Si-based active material and the first solid electrolyte.

The anode mixture contains at least the Si-based active material and the first solid electrolyte, and may further contain at least one of the first conductive material and a binder. Also, as described above, the coating layer may be formed on the surface of the Si-based active material. It means that the anode mixture may contain the above described coated active material. These materials are in the same contents as those described in "A. All solid state battery" above; thus the descriptions herein are omitted.

Also, the anode mixture may and may not contain a dispersion medium. The dispersion medium preferably has low reactivity with the Si-based active material and the first solid electrolyte. Examples of the dispersion medium may include butyl butyrate, dibutyl ether, and heptane. Incidentally, the anode mixture containing the dispersion medium may be referred to as anode slurry in some cases.

As the method for forming the anode layer, a known arbitrary method is applicable. Examples of the method for forming the anode layer may include a method of coating and drying the anode slurry. The anode slurry may be obtained by, for example, kneading the anode mixture (anode mixture containing dispersion medium). Examples of the means of kneading may include an ultrasonic homogenizer, a shaker, a thin-film spin type mixer, a dissolver, a homo mixer, a kneader, a roll mill, a sand mill, an attritor, a ball mill, a vibrator mill, and a high-speed impeller mill. Also, examples of the method for pasting the anode slurry may include a doctor blade method, a die coating method, a gravure coating method, a spray coating method, a static coating method, and a bar coating method.

In the present disclosure, the anode layer is preferably formed by pressing the anode mixture formed in a layer shape. The pressing pressure is, for example, 0.5 ton/cm$^2$ or more, may be 1 ton/cm$^2$ or more, and may be 2 ton/cm$^2$ or more. Meanwhile, the pressing pressure is, for example, 10 ton/cm$^2$ or less. Examples of the method for pressing may include flat-plate pressing and roll pressing. Also, a heat treatment may be conducted during pressing.

3. Other Steps

The method for producing the all solid state battery in the present disclosure usually comprises a cathode layer forming step and a solid electrolyte layer forming step. Regarding the method of forming the cathode layer and the method of forming the solid electrolyte layer, a known arbitrary method is respectively applicable. Also, an all solid state battery obtained by these steps is in the same contents as that described in "A. All solid state battery" above.

The present disclosure may also provide a method for producing an anode active material for an all solid state battery, the method comprising the above described preparing step. In this case, the anode active material for the all solid state battery is preferably the above described coated active material. Also, the present disclosure may provide a method for producing an anode layer for an all solid state battery, the method comprising the above described preparing step and anode layer forming step.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Example 1

<Fabrication of Anode Structure>

An anode active material (Si particle, average particle size: 0.19 μm), a sulfide solid electrolyte (10LiI-15LiBr-75(0.75Li$_2$S-0.25P$_2$S$_5$), average particle size: 0.5 μm), a conductive material (VGCF), and a binder (PVdF) were prepared. These were weighed so as to be the anode active material:the sulfide solid electrolyte:the conductive material:the binder=52.7:40.9:4.2:2.1 in the weight ratio, and mixed with a dispersion medium (heptane). The obtained mixture was dispersed by an ultrasonic homogenizer (US-50 from SMT Corporation) to obtain anode slurry. The obtained slurry was pasted on an anode current collector (copper foil), and dried in the conditions of at 100° C. and for 30 minutes. After that, the product was punched out into the size of 1 cm$^2$ to obtain an anode structure having the anode layer and the anode current collector. The thickness of the anode layer was 31 μm.

<Fabrication of Cathode Structure>

A cathode active material (LiNi$_{1/3}$Co$_{1/3}$Mn$_{1/3}$O$_2$), a sulfide solid electrolyte (10LiI-15LiBr-75(0.75Li$_2$S-0.25P$_2$S$_5$)), a conductive material (VGCF), and a binder (PVdF) were prepared. These were weighed so as to be the cathode active material:the sulfide solid electrolyte:the conductive material:the binder=84.7:13.4:1.3:0.6 in the weight ratio, and mixed with a dispersion medium (heptane). The obtained mixture was dispersed by an ultrasonic homogenizer (UH-50 from SMT Corporation) to obtain cathode slurry. The obtained cathode slurry was pasted on a cathode current collector (aluminum foil) and dried in the conditions of at 100° C. and for 30 minutes. After that, the product was punched out into the size of 1 cm$^2$ to obtain a cathode structure having the cathode layer and the cathode current collector. The thickness of the cathode layer was 50 μm.

<Fabrication of all Solid State Battery>

A sulfide solid electrolyte ($10LiI-15LiBr-75(0.75Li_2S-0.25P_2S_5)$) was placed in a cylindrical ceramic having inner diameter of 1 cm$^2$ and pressed under 4 ton/cm$^2$ to obtain a solid electrolyte layer (15 µm thick). The cathode structure and the anode structure were arranged so as to sandwich the obtained solid electrolyte layer and pressed under 4 ton/cm$^2$. After that, a stainless stick was respectively put in the cathode side and the anode side and confined at 5 MPa to obtain an all solid state battery.

Comparative Example 1

An all solid state battery was obtained in the same manner as in Example 1 except that a Si particle (average particle size: 2.6 µm) was used as the anode active material.

Example 2

A coated active material was fabricated using a particle complexing machine (NOB-MINI from HOSOKAWA MICRON CORPORATION). Into a treatment container, 20 g of an anode active material (Si particle, average particle size: 0.19 µm), 4.74 g of a sulfide solid electrolyte ($10LiI-15LiBr-75(0.75Li_2S-0.25P_2S_5)$, average particle size: 0.5 µm), and 0.2 g of a conductive material (ball-shaped carbon, specific surface area: 93 m$^2$/g) were projected. A compression shearing treatment was conducted in the conditions of, distance between the rotation blade of a compression shearing rotor and the wall inside the treatment container: 1 mm, pressure: 100 Pa, blade peripheral speed: 26.4 m/s, and treatment time: 12.5 minutes, to obtain a coated active material.

An all solid state battery was obtained in the same manner as in Example 1 except that the obtained coated active material was used as the anode active material. Incidentally, in Example 2, the amount of the sulfide solid electrolyte used for fabricating the anode slurry was adjusted so that the proportion of the anode active material in the anode layer became the same as that in Example 1.

Examples 3 to 5

An all solid state battery was obtained in the same manner as in Example 2 except that a ball-shaped carbon (specific surface area: 142 m$^2$/g), a ball-shaped carbon (specific surface area: 370 m$^2$/g), and a fiber carbon (specific surface area: 500 m$^2$/g) were respectively used as the conductive material used in the coated active material.

[Evaluation]
<SEM Observation>

Figure 3:
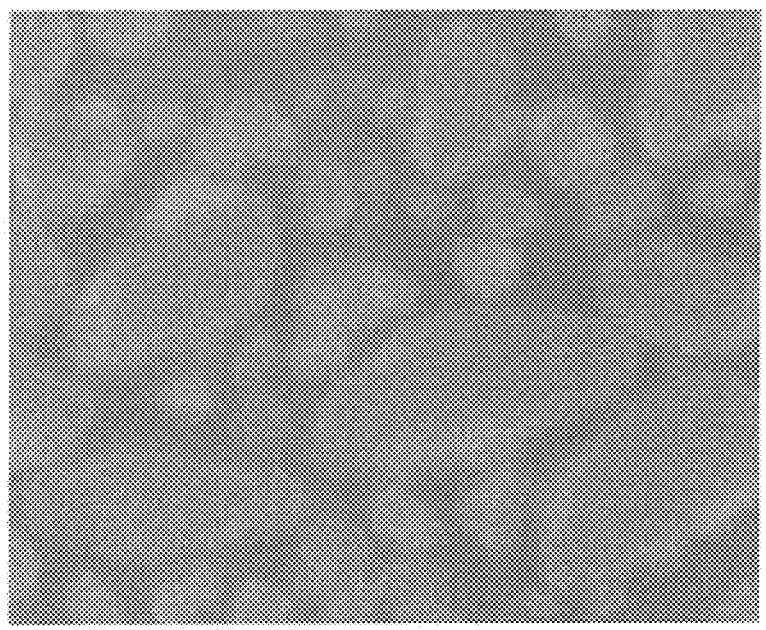
FIG. 3 is the result of an SEM observation of the coated active material fabricated in Example 2.

The coated active material fabricated in Example 2 was observed using a scanning electron microscope (SEM). The result is shown in FIG. 3. As shown in FIG. 3, it was confirmed that a thin coating layer was formed on the surface of the Si particle. Incidentally, in FIG. 3, the sulfide solid electrolyte included in the coating layer is photographed in white on the surface of the Si particle. The thickness of the coating layer was approximately 100 nm.

Figure 4:
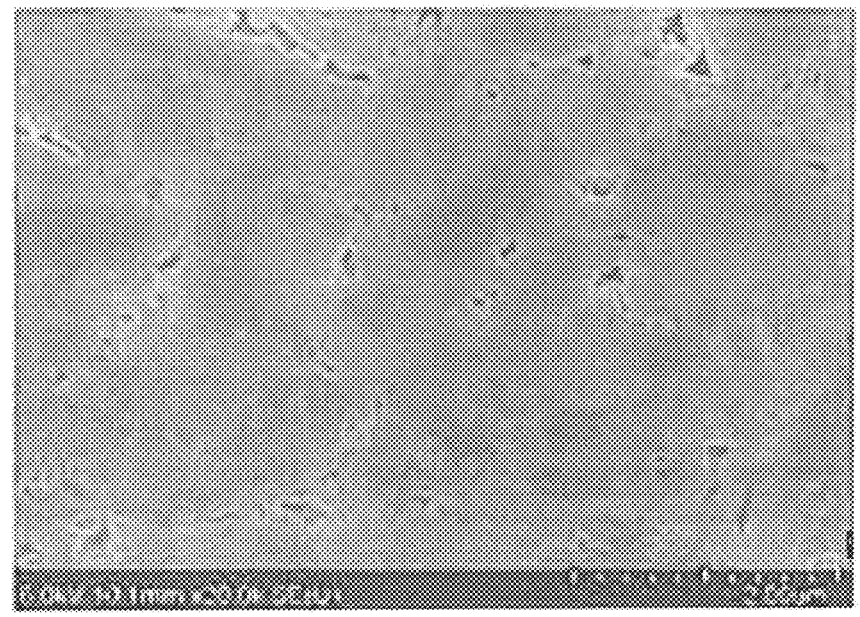
FIG. 4 is the result of an SEM observation of the cross-section of the anode layer fabricated in Example 1.
Figure 5:
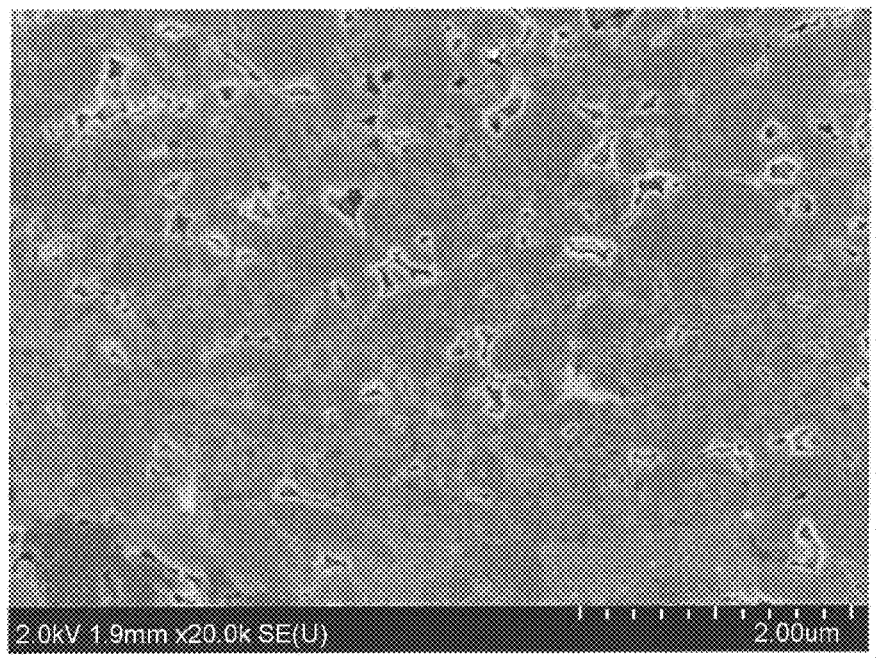
FIG. 5 is the result of an SEM observation of the cross-section of the anode layer fabricated in Example 2.
Figure 6:
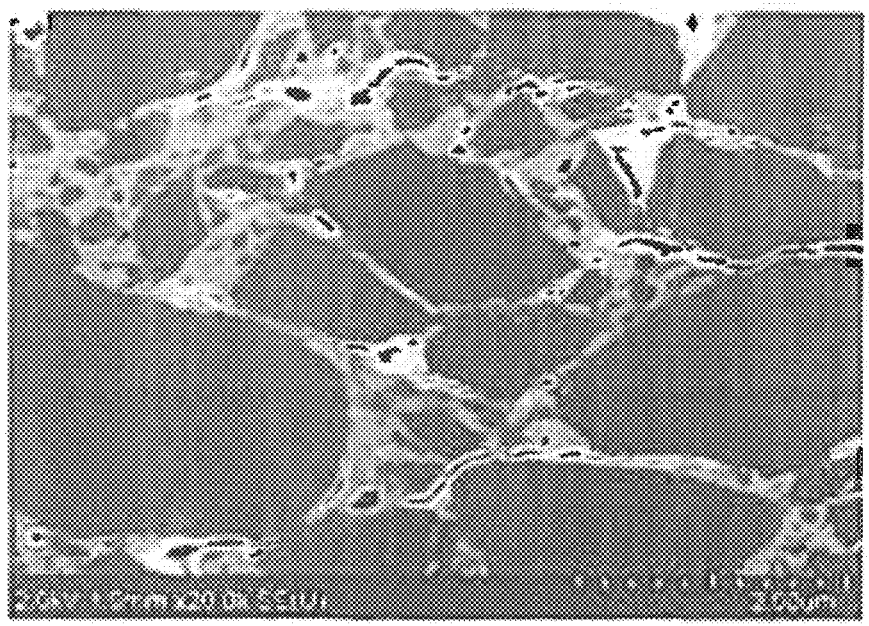
FIG. 6 is the result of an SEM observation of the cross-section of the anode layer fabricated in Comparative Example 1.

Also, the cross-sections of the anode layers (after pressing) fabricated in Examples 1, 2, and Comparative Example 1 were observed using a field emission type scanning electron microscope (FE-SEM). The results are respectively shown in FIG. 4 to FIG. 6. As shown in FIG. 4 and FIG. 5, it was confirmed that a lot of the micro pore (pore of which area is 0.1 µm$^2$ or less) were formed in Examples 1 and 2. On the other hand, as shown in FIG. 6, it was confirmed that there was a little of the micro pore in Comparative Example 1; Si particles having large particle size contacted with each other and thereby bridges were formed.

Figure 7:
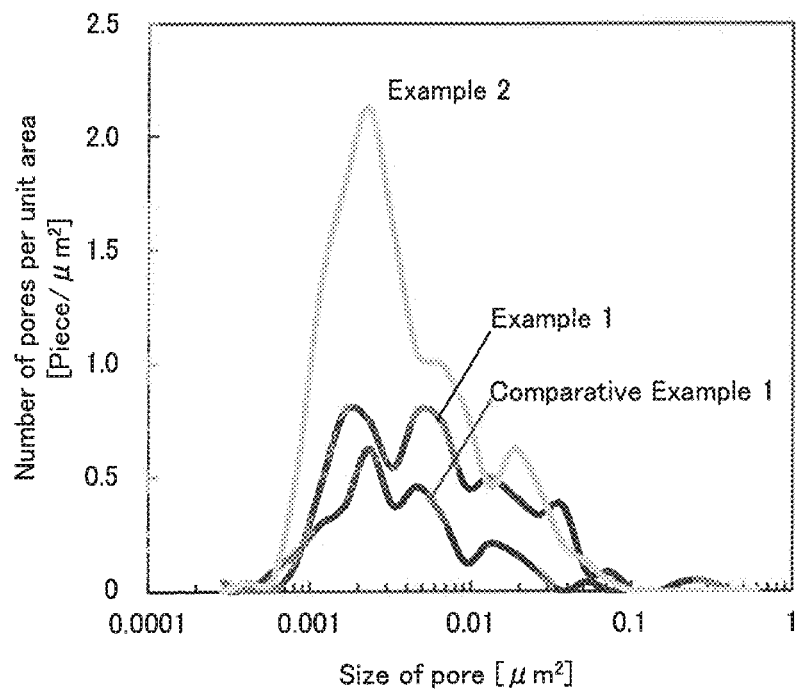
FIG. 7 is the pore distributions in the anode layers fabricated in Examples 1, 2, and Comparative Example 1.

Also, based on the FE-SEM images (magnification: 20000 times, evaluation area: 4 µm by 6 µm), pores (voids) were visually specified. Regarding the specified pores, the area of each pore was determined by image processing. This operation was repeated to make a histogram. The results are shown in FIG. 7. As shown in FIG. 7, it was confirmed that the number of the micro pore in Examples 1 and 2 was more than that in Comparative Example 1. In particular, the number of the micro pore in Example 2 was remarkably more than that in Example 1. Also, from these results, the number of the micro pore per unit area (piece/µm$^2$) was determined. The results are shown in Table 1.

<Increasing Rate in Confining Pressure>

A layered cell was obtained by layering 4 pieces of the all solid state battery obtained in Examples 1, 2, and Comparative Example 1 respectively. Incidentally, the confining pressure was the same as the above. An increasing rate in confining pressure during first charge was measured using the obtained layered cells. In specific, the confining pressures of the layered cells were monitored in a constant rate; at the rate of 0.1 C, the cells were charged to the voltage of 4.5 V, and the confining pressure at the voltage of 4.5 V was measured. The rate of the confining pressure at the voltage of 4.5 V to the confining pressure in the state before charge was regarded as the increasing rate in confining pressure. The results are shown in FIG. 8, FIG. 9, and Table 1.

TABLE 1

|  | Number of micro pores per unit area [piece/µm$^2$] | Increasing rate in confining pressure [%] |
| --- | --- | --- |
| Comparative Example 1 | 3.3 | 679 |
| Example 1 | 6.6 | 479 |
| Example 2 | 12.2 | 223 |

Figure 8:
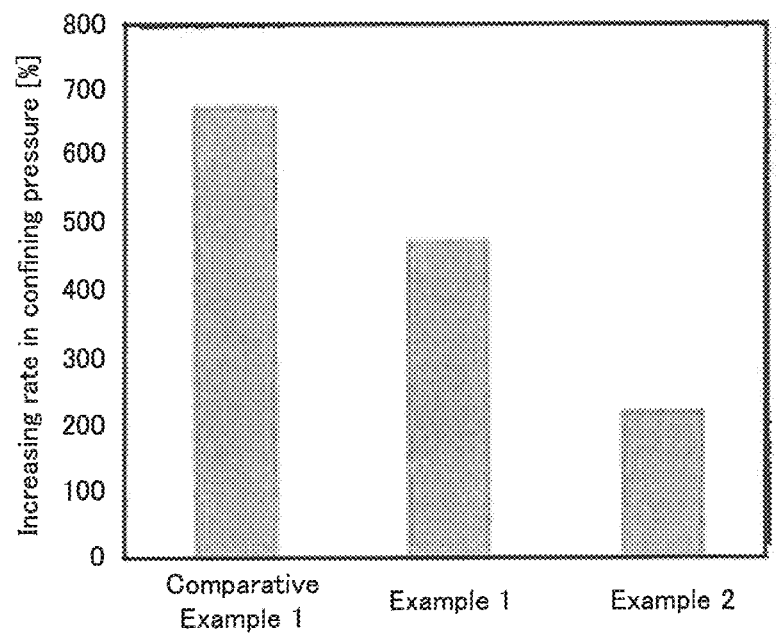
FIG. 8 is the result of increasing rate in confining pressure regarding the layered cells obtained in Examples 1, 2, and Comparative Example 1.
Figure 9:
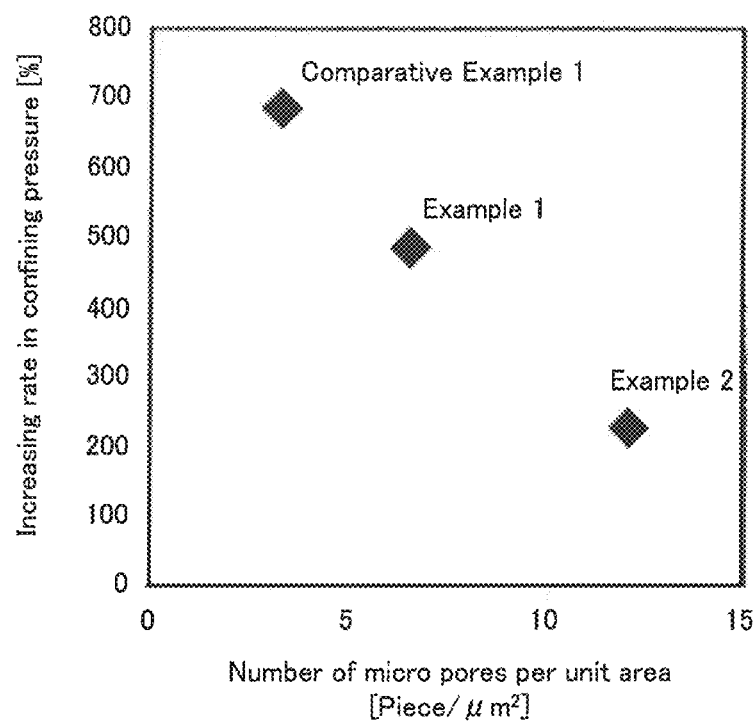
FIG. 9 is a graph showing the relation between the number of the micro pore and the increasing rate in confining pressure.

As shown in FIG. 8 and Table 1, it was confirmed that the increasing rate in confining pressure in Examples 1 and 2 was lower than that in Comparative Example 1. This is presumably because the formation of bridges of Si particles was inhibited since the average particle size of the Si particle was small. Also, as shown in FIG. 8 and Table 1, it was confirmed that there was correlation between the number of the micro pore per unit area and the increasing rate in confining pressure. In specific, the increasing rate in confining pressure decreased as the number of the micro pore increased. In this manner, it was confirmed that increasing the number of the micro pore present in the anode layer was effective for reducing the increasing rate in confining pressure. In particular, the number of the micro pore in Example 2 was remarkably more than that in Comparative Example 1. One of the reasons therefor is that the coated active material was used in Example 2. In specific, the thin coating layer was formed on the surface of the Si particle in Example 2, and pressing presumably made the coating layer consolidated to result in the generation of a lot of the micro pore.

<Coverage Measurement>

An X-ray photoelectron spectroscopy (XPS) measurement was conducted to the coated active material fabricated in Example 2 and ER (Element Ratio) was measured from the peak cross-sectional area of each element. Based on the ER value of each element, the coverage of the coating layer was determined from the below formula. Incidentally, the denominator of the below formula corresponds to the amount of all the elements in the coated active material, and the numerator of the below formula corresponds to the amount of all the elements in the coating layer:

$$\text{Coverage (\%)} = (ER_P + ER_S + ER_{Br} + ER_I + ER_C)/(ER_{Si} + ER_P + ER_S + ER_{Br} + ER_I + ER_C).$$

As the result, the coverage of the coating layer in the coated active material fabricated in Example 2 was 85%. Incidentally, in the anode layer of the anode structure fabricated in Example 1, the sulfide solid electrolyte and the conductive material occupied 69% of the surface of the Si particle.

<Internal Resistance Evaluation>

An internal resistance evaluation by a DC-IR method was conducted to the all solid state batteries obtained in Examples 2 to 5. In specific, OVC of the all solid state batteries was adjusted to be 3.7 V, and thereafter the voltage when the batteries were discharged at 17.2 mA for 10 seconds, was measured. The internal resistance was determined from the voltage change from OCV. The results are shown in FIG. 10 and Table 2.

TABLE 2

| | Specific surface area of conductive material [m²/g] | Internal resistance [Ω/cm²] |
| --- | --- | --- |
| Example 2 | 93 | 21.4 |
| Example 3 | 142 | 21.4 |
| Example 4 | 370 | 20.6 |
| Example 5 | 500 | 19.0 |

Figure 10:
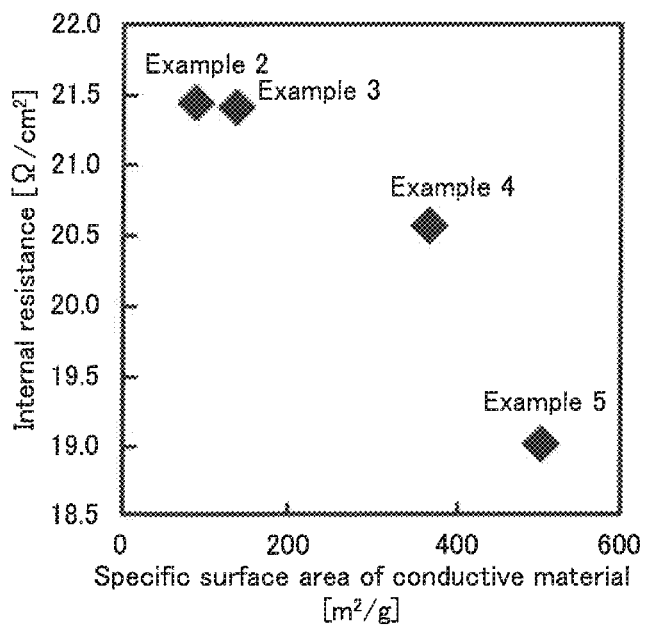
FIG. 10 is a graph showing the relation between the specific surface area of the conductive material and the internal resistance.

As shown in FIG. 10 and Table 2, confirmed was that the tendency of the larger the specific area of the conductive material was, the more the internal resistance decreased. It occurred presumably because the contact area of the conductive material with the anode active material increased since the specific surface area of the conductive material was large. In particular, it was confirmed that the internal resistance remarkably decreased when the specific surface area of the conductive material was 370 m²/g or more.

REFERENCE SIGNS LIST 1 cathode layer
2 anode layer
3 solid electrolyte layer
4 cathode current collector
5 anode current collector
10 all solid state battery

What is claimed is:

1. An all solid state battery comprising a cathode layer, an anode layer, and a solid electrolyte layer formed between the cathode layer and the anode layer; wherein
the anode layer contains a Si-based active material of which average particle size is less than 2.6 μm, and a first solid electrolyte,
a coating layer containing a sulfide solid electrolyte as a second solid electrolyte is formed on a surface of the Si-based active material,
a coverage of the coating layer is 70% or more, and
the sulfide solid electrolyte comprises an ion conductor containing a Li element, an A element, wherein A is at least one of P, As, Sb, Si, Ge, Al, and B, and a S element,
wherein the ion conductor has any one of $PS_4^{3-}$ structure, $SiS_4^{4-}$ structure, $GeS_4^{4-}$ structure, $AlS_3^{3-}$ structure, and $BS_3^{3-}$ structure, as the main component of anion.

2. An all solid state battery comprising a cathode layer, an anode layer, and a solid electrolyte layer formed between the cathode layer and the anode layer; wherein
the anode layer contains a Si-based active material of which average particle size is less than 2.6 μm, and a first solid electrolyte,
a coating layer containing a sulfide solid electrolyte as a second solid electrolyte is formed on a surface of the Si-based active material,
a coverage of the coating layer is 70% or more, and
the sulfide solid electrolyte comprises an ion conductor containing a Li element, an A element, wherein A is at least one of P, As, Sb, Si, Ge, Al, and B, and a S element,
wherein the sulfide solid electrolyte contains at least any one of LiF, LiCl, LiBr, and LiI.

3. An all solid state battery comprising a cathode layer, an anode layer, and a solid electrolyte layer formed between the cathode layer and the anode layer; wherein
the anode layer contains a Si-based active material of which average particle size is less than 2.6 μm, and a first solid electrolyte,
a coating layer containing a sulfide solid electrolyte as a second solid electrolyte is formed on a surface of the Si-based active material,
a coverage of the coating layer is 70% or more, and
the sulfide solid electrolyte comprises an ion conductor containing a Li element, an A element, wherein A is at least one of P, As, Sb, Si, Ge, Al, and B, and a S element,
wherein the sulfide solid electrolyte has at least any one of Thio-LISICON type crystal structure, LGPS type crystal structure and Argyrodite type crystal structure.

4. The all solid state battery according to claim 1, wherein a thickness of the coating layer is 30 nm or less.

5. The all solid state battery according to claim 2, wherein a thickness of the coating layer is 30 nm or less.

6. The all solid state battery according to claim 3, wherein a thickness of the coating layer is 30 nm or less.

7. The all solid state battery according to claim 1, wherein the coating layer contains a conductive material.

8. The all solid state battery according to claim 2, wherein the coating layer contains a conductive material.

9. The all solid state battery according to claim 3, wherein the coating layer contains a conductive material.

10. The all solid state battery according to claim 7, wherein a specific surface area of the conductive material is 370 m²/g or more.

11. The all solid state battery according to claim 8, wherein a specific surface area of the conductive material is 370 m²/g or more.

12. The all solid state battery according to claim 9, wherein a specific surface area of the conductive material is 370 m²/g or more.

13. The all solid state battery according to claim 1, wherein, in a cross-section of the anode layer, when a pore having an area of 0.1 μm² or less is regarded as a micro pore, the number of the micro pore per unit area is 5 pieces/μm² or more.

14. The all solid state battery according to claim 2, wherein, in a cross-section of the anode layer, when a pore having an area of 0.1 μm² or less is regarded as a micro pore, the number of the micro pore per unit area is 5 pieces/μm² or more.

15. The all solid state battery according to claim 3, wherein, in a cross-section of the anode layer, when a pore having an area of 0.1 μm$^2$ or less is regarded as a micro pore, the number of the micro pore per unit area is 5 pieces/μm$^2$ or more.

* * * * *